(12) United States Patent
Medico, Jr. et al.

(10) Patent No.: US 6,206,607 B1
(45) Date of Patent: *Mar. 27, 2001

(54) ENVIRONMENTAL POROUS PAVEMENT CONSTRUCTION, AND METHOD FOR MANUFACTURING PAVEMENT CONSTRUCTION

(75) Inventors: John J. Medico, Jr.; Christine Meoli Medico, both of Sarasota; Peter J. Medico, Pensacola; John C. Medico, III, Sarasota, all of FL (US)

(73) Assignee: John, J. Medico, Jr. Christine Meoli Medico Family Trust, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/797,059

(22) Filed: Feb. 10, 1997

(51) Int. Cl.⁷ ................................................... E01C 11/00
(52) U.S. Cl. .................. 404/2; 404/17; 404/36; 404/44; 404/71
(58) Field of Search .................. 404/2, 4, 17, 27, 404/30, 32, 36, 71, 72, 82, 91, 92, 75, 44; 405/50

(56) References Cited

U.S. PATENT DOCUMENTS

| | | |
|---|---|---|
| 3,171,335 | 3/1965 | Pincon et al. ................ 94/3 |
| 3,870,422 * | 3/1975 | Medico, Jr. ............... 404/27 X |
| 4,026,658 | 5/1977 | Nuendorf et al. ............. 404/84 |
| 4,073,753 * | 2/1978 | Hauge ........................ 404/32 X |
| 4,376,595 * | 3/1983 | Shaw .......................... 404/4 X |
| 4,396,312 * | 8/1983 | Nilsson ....................... 404/17 X |
| 4,752,155 | 6/1988 | Rennich ...................... 404/95 |
| 4,818,139 | 4/1989 | Brock et al. ................. 404/81 |
| 4,944,630 | 7/1990 | Brock et al. ................. 404/83 |
| 4,946,307 | 8/1990 | Jakob ......................... 404/91 |
| 5,015,120 | 5/1991 | Brock et al. ................. 404/108 |
| 5,035,534 | 7/1991 | Brock et al. ................. 404/81 |
| 5,054,931 | 10/1991 | Farnham et al. . |
| 5,078,540 | 1/1992 | Jakob et al. . |
| 5,173,115 * | 12/1992 | Glynn, Jr. et al. . |
| 5,203,642 | 4/1993 | Heller et al. . |
| 5,221,338 * | 6/1993 | Gaudio et al. . |
| 5,291,876 | 3/1994 | Milstead . |
| 5,348,418 | 9/1994 | Campbell . |
| 5,375,940 | 12/1994 | Kobayashi ................ 404/2 |
| 5,378,059 | 1/1995 | Brock . |
| 5,405,214 | 4/1995 | Campbell . |
| 5,441,361 | 8/1995 | Campbell . |
| 5,468,539 | 11/1995 | Crivelli ................ 404/32 X |
| 5,533,828 | 7/1996 | Campbell . |
| 5,533,829 | 7/1996 | Campbell . |
| 5,605,721 | 2/1997 | Di Geronimo ............ 427/373 |

FOREIGN PATENT DOCUMENTS

478927 * 11/1976 (AU) ...................... 404/2

OTHER PUBLICATIONS

"Medico Believes Inventors Can Solve Pollution Problems", Siesta Key Pelican, Apr. 7, 1977, pp. 4–5.
Brochure, "Medico Porous Concrete", The World of Concrete, Las Vegas, Nevada, USA, Feb. 26–Mar. 2, 1983.
Brochure, "BHS ROSS Compulsory Mixer", Dec. 1988.
Brochure, "Roadtec SP 100 Gravity Feed Paver" (undated).
Brochure, "Syntene—An Evolutionary Process That Began in 250 A.D." (undated).
Brochure, "Roadtec RP 130 Rubber Tired Paving Machine" (undated).
Brock, J. D. "Hot Recycling of Asphalt", Techn. Bulletin T–113, Astec Inds., Inc. (1985).
Brochure, "Hartl Powertrack" 10 pgs, (undated).

* cited by examiner

Primary Examiner—James A. Lisehora
(74) Attorney, Agent, or Firm—Fitzpatrick, Cella, Harper & Scinto (57) ABSTRACT

A porous pavement construction formed from environmental porous pavement materials is formed with a number of aqueduct channels located underneath the pavement surface, so that water can percolate downward into the pavement and enter the channels. Methods of forming this pavement structure are also discussed.

16 Claims, 8 Drawing Sheets

ENVIRONMENTAL POROUS PAVEMENT CONSTRUCTION, AND METHOD FOR MANUFACTURING PAVEMENT CONSTRUCTION

BACKGROUND OF THE INVENTION

1. Field of the Invention

This invention pertains to pavement material, pavement construction, and both devices and methods for forming such pavement material and pavement constructions. More particularly, this invention concerns the recycling of asphalt and concrete, and the construction of environmentally sound and safe roads.

2 Description of the Related Art

Figure 1:
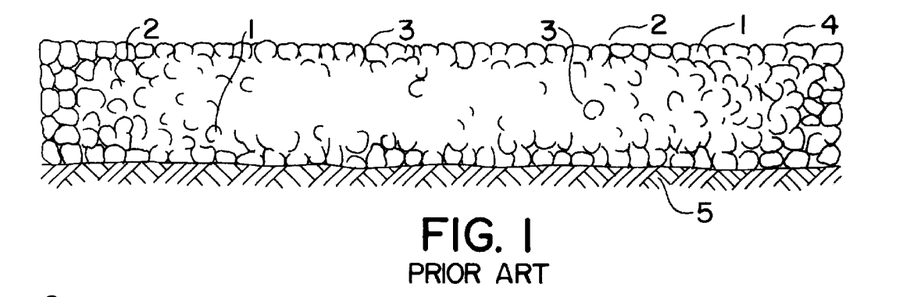
FIG. 1 is a cross-sectional view of a conventional section of asphalt pavement.

FIG. 1 is a cross-section of a region of a conventional asphalt pavement. Large aggregate 1 is mixed with small aggregate (or sand) 2, and these components are bound by tar 3. The top of the asphalt pavement 4 is exposed to traffic, while the bottom of the asphalt pavement rests on existing sub-base soil 5.

The top of the asphalt pavement 4 is exposed to the elements, and so is subjected to ultraviolet light from the sun, rain, snow, freezing during winter and thaw during spring. The pavement also experiences frictional wear due to vehicular traffic thereon.

Over time, these environmental and service factors cause the asphalt pavement to deteriorate. As a result, particles of asphalt 4, large aggregate 1, and small aggregate or sand 2 coated with tar 3 may be swept into drainage systems such as pipes and storm inlets. These drainage systems typically discharge into lakes, rivers, streams or oceans. As will be explained hereafter, such pavement particles contribute to water pollution.

The specific gravity of the tar particles 3 is very close to that of water, which has a specific gravity of one. Accordingly, when rainwater, sleet, and melting snow drain from the asphalt pavement, the tar particles 3 float and are swept into the bodies of water, such as lakes, rivers, streams and oceans, which receive the water discharge.

Tar particles 3 that are attached to small aggregates such as sand 2 are usually carried off into drainage systems such as pipes, culverts and storm inlets, where they settle to the bottom, since the tar and aggregate together have a specific gravity greater than that of the water.

Over time, as the asphalt pavement continues to deteriorate, a considerable quantity of aggregates 1 and 2 coated with tar 3 accumulates at the bottom of bodies of water, thereby depleting the oxygen in the water, and reducing the amount of aquatic life. In addition, the tar may contain heavy metals, which have already been shown to have other adverse effects. The results of such pollution are well-known, and it can markedly affect the health of wildlife and humans.

The continued degradation of asphalt pavement often results in pot-holes, which are major structural failures of the asphalt pavement. Asphalt material breaking away from these potholes also causes accelerated pollution of water resources in the manner already discussed.

A substantial amount of the water pollution which enters ground water, whether in aquifers, streams, rivers, bays or oceans, therefore originates as runoff from asphalt and concrete roads and parking lots. Wherever there are asphalt or concrete roads, driveways, or parking lots, pavement-based pollutants are likely to be introduced into the water runoff.

These water pollutants include hydrocarbons, which are inherently present in asphalt pavement. Asphalt pavement is composed of tar, sand and rock aggregates. The tar component of an asphalt road functions as a binder which holds the aggregate particles together. Tar is a thermo-plastic material, and it deteriorates when exposed to heat and/or ultraviolet energy. Since any asphalt used outside is continually exposed to heat and ultraviolet energy from the sun, that asphalt eventually degrades. Furthermore, vehicle traffic also wears down the asphalt road surface. As a result of both the thermal/ultraviolet degradation and physical wear, components of the asphalt road are released. As previously explained, these components are carried by storm water runoff into roadside waters and ditches which lead through stormwater systems to large bodies of water such as lakes, rivers, bays or oceans, and from there, into drinking water aquifers.

Still other sources of pavement degradation are the freeze-thaw cycles experienced during winter seasons, and the pumping action produced by vehicle traffic. Both of these phenomena physically flex the roadways and so cause pavement degradation, which further undermines both asphalt and concrete pavement.

Both asphalt and concrete roads also contain oil drippings which have fallen from passing vehicles. These oil drippings, which are eventually flushed into water outfalls, are a further source of water pollution.

Thus, tars, pavement particles, and vehicular oil drippings, whether on asphalt or concrete pavement, all of which are polluting substances, are carried into stormwater systems such as sewers, ditches, culverts, etc., from where they are ultimately deposited into streams, lakes, rivers, bays and oceans, so that they can enter the drinking water or food supplies. Using retention ponds to store stormwater is of no benefit; such ponds grow polluted and they become another source of ground water polluted by hydrocarbons and heavy metals.

It has been determined that hydrocarbon pollutants entering the water supply create serious health problems for both humans and wildlife. Such hydrocarbons are particularly detrimental when they enter the drinking water supply, since many water treatment plants add chlorine to the water to kill bacteria. Chlorination of the drinking water creates conditions which lead to the production of chlorinated hydrocarbons. Chlorinated hydrocarbons are carcinogenic, so the presence of such cancer-causing chemicals is clearly undesirable.

Water treatment plants are not usually equipped to remove hydrocarbons, sulfur or dissolved metals from drinking water. Accordingly, by eliminating or at least reducing the amount of hydrocarbons, sulfur and heavy metals emanating from asphalt roads, adverse effects on drinking water can be reduced.

Still another reason why asphalt roads contribute to water pollution is because road tar contains heavy and light metals and sulfur. Heavy metals (i.e., copper, lead and mercury) and light metals (i.e., aluminum and arsenic) have been shown to be detrimental to the health of man and wildlife, especially if they enter the food chain. Sulfur, when combined with rainwater, acidifies the water, and the acidic runoff in turn acidifies lakes, rivers, streams, bays and even oceans. While the presence of such acids in water has been attributed to acid carrying clouds, which produce "acid rain," asphalt roads also contain sulfur which can be flushed out and contribute to acidic runoff. This acidic runoff, flushed from parking lots, streets and highways, is another source of acid water, which is perceived as the phenomenon "acid rain".

It is therefore essential that the tar in asphalt roads be rendered environmentally safe as a binding element. One way to do this would be to recycle the road material into an environmental non-polluting porous pavement.

Even non-polluting water runoff can be troublesome, because of the flooding which can result. This is a particular concern in newly-developed areas, where the construction of residential and business sub-divisions, shopping centers and roads may lead to increased water runoff. If the runoff exceeds the area's drainage capacity, flooding can occur.

A further concern in the design of roadways is the need to avoid having standing water on the roadway. It has been determined that the majority of skidding accidents occur because water has accumulated on the roadway. When a vehicle passes over such standing water, the water may accumulate under one or more of the vehicle's tires. This causes hydroplaning, which is a situation where the vehicle tire loses contact with the road surface, and "floats" on a film of water. Needless to say, hydroplaning is quite dangerous, since the ensuing skidding can cause a loss of control Thus, there is a substantial need to provide roads which do not allow standing water to form thereon.

Still another concern in designing roads arises because conventional asphalt and concrete roads are composed of stone aggregates and sand which become polished by vehicle traffic. This polishing reduces the coefficient of friction between vehicles tires and the road, making skidding more likely.

Moreover, asphalt roads contain oils, which further reduces the coefficient of friction between tires and the asphalt roadbed. In addition, oil drippings which accumulate on the surface of either asphalt or concrete roads also can cause skidding Accordingly, it is highly desirable to provide roads in which there is a high coefficient of friction between the road surface and the tires of passing vehicles.

Another aspect of this invention relates to improving the types of trucks which are used to process road paving material as it is shipped to the location where it will be formed into pavement. Conventional bulk mixing machines, which are known as transit mix trucks, are designed to mix conventional concrete. These machines are designed to mix relatively high slump materials, high meaning slumps ranging from 1–4. Lower slumps of concrete, i.e., concrete containing lower water-cement ratios, are difficult to produce using transit mix trucks, since such trucks contain angularly positioned rotatable drums with fixed internal blades that mix the concrete as it flows over the blades of the rotating drums. If one tries to produce low slump low moisture concrete in these machines, one ends up producing inhomogenous balls of concrete which have undergone little or no mixing. Furthermore, transit mix trucks are not designed to handle admixtures, as described throughout this application. Since such admixtures would render the mixing machines "sticky", the addition of such admixtures would cause cement to adhere to the inside surface of the truck's drum, rendering it virtually impossible to clean, and possibly even damaging the transit-mix truck.

Another conventional concrete mixing machine is known as a mobile mixer. Mobile mixers carry dry sand, stone aggregates, water and admixtures in separate compartments which are arranged on a truck bed. When the mobile mixer arrives at a construction site, the materials are batched mechanically, usually through a series of gates and valves. Mixing is performed by a mixing augur provided at the rear of the machine. One disadvantage to using these mobile mixers is that the augur must rotate continuously, and can never stop during processing, because the augur must rotate in order to achieve a homogenous mix. This, however, is nearly impossible to achieve, since whenever the machine is moved to different job sites, the augur must be stopped so that concrete will not pour out from the truck during relocation. Accordingly, the mobile mixer, while superior to the transit mix truck for batching low slump mixes, nevertheless suffers from the same disadvantages that were discussed previously with regard to the mobile mixers, namely, when the machine is stopped for transport, dry and non-homogenous concrete results.

While there are other types of mixing machines commercially available on the market, such machines are of quite limited mobility, or they otherwise suffer from at least some of the shortcomings of the transit mix truck and/or the mobile mixer.

Still another disadvantage of both the transit mix truck and the mobile mixer is that, once they have run out of concrete, they usually must be returned to a batch plant to be replenished with a fresh supply of material. These machines are therefore not well-suited for on-site batching and mixing.

Furthermore, the batching and mixing of recycled asphaltic products ("RAP") are not easily accomplished using currently available equipment.

SUMMARY OF THE INVENTION

In contrast to the prior art, the invention of recycled environmental porous pavement reverses the pollution cycle caused by asphalt roads and converting the hydrocarbons and tar polluting constituents into environmentally safe material and constructing a recycled porous pavement, which helps to control stormwater runoff and flooding, thereby greatly reducing pollution to waterways.

One aspect of the present invention involves recycled environmental porous pavement, which is constructed by converting otherwise polluting asphalt or concrete pavement into a non-polluting recycled environmental porous pavement. The porous pavement allows water to pass through it at a high rate, and so it reduces water pollution which would otherwise occur because of runoff from asphalt and concrete roads. The porous pavement also reduces flooding, and since it allows water to pass through to the sub-soil, it facilitates recharging ground water-tables and aquifers. Because there is so little stormwater runoff, pollution of streams, lakes, rivers and oceans is greatly reduced.

It is especially desirable that tars used as binding agents in asphalt roads be rendered environmentally safe. This invention does so by recycling asphalt roads into non-polluting porous pavement.

One aspect of the present discovery, recycled environmental porous pavement, reverses the pollution cycle by recycling existing polluting asphalt and concrete roads and other polluting materials into chemically safe and non-polluting paving materials. By recycling asphalt and concrete roads into non-polluting porous pavement, both water runoff and pollution can be virtually eliminated.

This invention includes the basic novel disclosure of the constituents of recycled environmental porous pavement.

One aspect of this invention is a pavement construction having a layer of porous pavement material with channels formed beneath its surface. The pavement is made from pavement particles, and the layer of pavement particles has voids at least some of which are disposed between adjacent pavement particles, allowing water to drain therethrough. In some cases, the channels can be substantially parallel to one another, and may have round or rectangular cross-sections. Materials such as porous concrete can be used.

This invention also relates to processes for making pavement particles, and pavement constructed as just described. For example, a pavement particle can be made by providing an inner aggregate body and forming a cementitious coating around at least a portion of that inner aggregate body. Asphalt, possibly recycled, can be used.

Yet another aspect of this invention is a process for making pavement by providing pavement particles, forming those particles into a layer of porous pavement material having a surface and voids, at least some of which are disposed between adjacent pavement particles. As the layer is formed, channels are formed beneath the surface of the layer. This can be done by providing elongated forming arms and forming the channels beneath the surface of the layer by shaping the pavement particles around the elongated forming arms. If desired, the forming arms can rotate, and may be heated.

DESCRIPTION OF THE PREFERRED EMBODIMENTS

Figure 2:
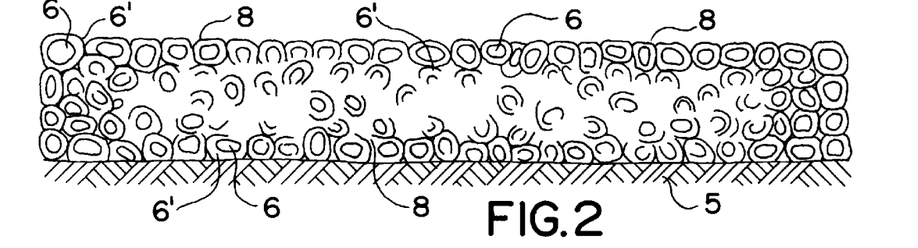
FIG. 2 is a cross-sectional view of porous pavement according to the present invention.

FIG. 2 depicts environmental porous pavement which can be produced in part by recycling pre-existing and otherwise polluting asphalt pavement. Alternatively, this pavement could be made using fresh asphalt, or even other materials, such as crushed recycled concrete, crushed stone aggregates and sand, crushed brick, crushed concrete masonry units, etc.

Each particle of pavement material consists of an inner core of aggregate 6 and an encapsulating outer shell 6' made from non-polluting cement. The inner aggregate core 6 is itself coated with recycled asphalt (fresh asphalt or other material also could be used). The pavement has a thickness T and is formed atop the existing sub-base soil 5.

Figure 3:
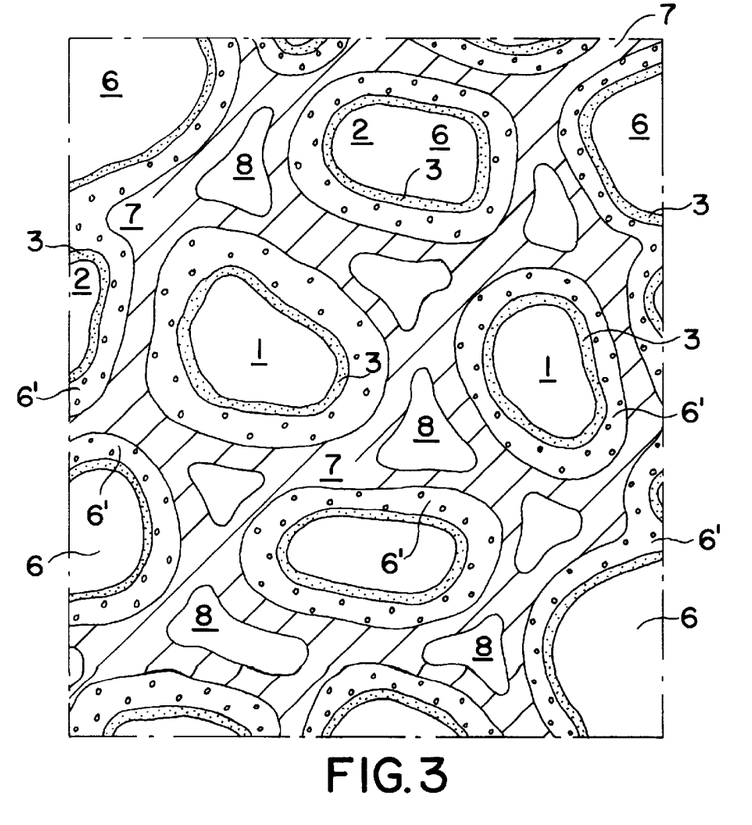
FIG. 3 is an enlarged cross-sectional view of the pavement shown in FIG. 2.

FIG. 3 shows an enlarged cross-sectional view of the environmentally non-polluting porous pavement which can be made from recycled asphalt pavement. Here, the aggregate core 6 consists of particles of aggregate 1, typically limerock, granite, or other hard stone, and sand 2, which are surrounded by an asphalt coating 3. This asphalt coating 3 envelopes the aggregate 1 and/or sand 2 (either partial or total coverage is possible). Although this asphalt is ordinarily a significant source of pollution in conventional asphalt roads, this pollution is prevented by the following aspects of this invention. Incidentally, existing federal, state and county roads, all of which contribute greatly to pollution, all contain the optimum size of aggregate materials, which is ⅜ in size or smaller. In any event, the size of the aggregate used in such existing roads is set forth in existing road standards.

A cementitious coating 6' composed of non-polluting cement, which is thermosetting, encapsulates the otherwise-polluting asphalt coating 3. Because the encapsulating coating 6' is thermosetting material, this ensures that the polluting asphalt element 3 is forever isolated, since thermosetting material does not soften in the sun or deteriorate from ultraviolet energy. Thus, the cementitious encapsulating coating 6' renders the pavement environmentally safe. An example of a typical cementitious coating is Portland cement, which is commercially available in the field of construction. In this regard, types I, II and III Portland cements are suitable for use with this invention and are all commercially available.

The recycled environmental porous pavement contains voids 8 through which water from rain or melted snow percolates, as shown in FIGS. 2 and 3. It is the presence of these voids which makes the pavement porous, and so it will be appreciated that the size and number of voids can be selected to provide the pavement with a particular porosity. Moreover, the subsequent discussion of mixing machines in the following portions of this application addresses the properties of asphalt, such as density, coating thickness, viscosity, etc. Testing has shown that a maximum of 44% voids is possible. The average percent voids is 27%. The voids are the result of the mix design that has been discussed and the result of the forming process.

An optional second coating sealant 7, shown in FIG. 3, which can be a non-polluting coating absorbed by the cementitious coating 6', may be provided to surround the individual pavement particles. This second coating 7 alters the flexural properties of the cementitious coating 6'. The second coating sealant 7 also serves to produce a second encapsulating seal, supplementing the seal formed by the cementitious coating 6'. Thus, there is added encapsulation and sealing of the existing asphalt coating 3 which at least partially surrounds the aggregates 1 and sand 2.

Examples of materials which can be used for the second environmental coating sealant 7 include families of polymeric admixtures such as liquid or powder which are water-based, non-polluting, and are commercially available in the construction field as liquid or powder acrylics or liquid or powder latex. Other commercially available liquid admixtures, specifically non-polluting, may also be used, and can be specified for a particular design.

This invention encompasses a wide variety of paving material compositions. The following examples of different pavement constructions are merely illustrative, and this invention should not be construed as being limited to such constructions.

The following mixing ratios are based upon volumetric measurements, not weight. This is due to the fact that the percentage of voids required in the porous pavement according to this invention is itself volumetric in nature. Boring and lab tests are used to determine the percentage of asphalt and the degree of encapsulation.

To determine the volumetric ratios which must be regulated, the mixing assembly 203 is calibrated based upon volumetric capacity.

EXAMPLE 1

If the mixing assembly contains 4.5 cubic yards (3.4 cubic meters) of material, a solid 1:2:4 mix design would contain 1 part of cement, 2 parts of sand, and 4 parts of aggregate or recycled asphaltic material (RAP). Thus, the total volumetric value for the solid mix design is 1+2+4=7 parts.

$$\frac{7-7}{7} \times 100 = 0\% \text{ porosity}$$

EXAMPLE 2

Porous pavement can be obtained by altering the mix used in Example 1 to decrease the 2 parts of sand to just 1 part of sand. Thus, the mix design for the porous pavement would be 1:1:4, that is 1 part cement, 1 part sand, and 4 parts of aggregate or recycled asphaltic product (RAP). The total volumetric value of the environmental mix design according to this example of the invention is 1+1+4=6 parts, and so the percent porosity is:

$$\frac{7-6}{7} \times 100 = 14.2\% \text{ porousity}$$

By eliminating sand altogether, and providing a mix composition of 1+0+4 (cement:sand:aggregate)=5 parts, $$\frac{7-5}{7} \times 100 = 28\% \text{ porousity}$$

EXAMPLE 3

Another embodiment of the pavement material according to this invention is as follows (the ratios given are volumetric ratios):

1 part of cementitious coating to 3 parts of aggregates coated with tar;

1 part of sand coated with tar; and

1/10 part of the second coating sealant.

EXAMPLE 4

Yet another example of pavement material employing these increased amounts of cementitious coating 6 and second coating sealant 7 is:

1½ parts of cementitious coating by volume;

3 parts of aggregates coated with tar by volume;

1 part of sand coated with tar by volume; and

⅕ part of second coating sealant by volume.

It has been determined that the volume of admixture added to the water does not affect the porosity of the mix design. The admixture serves to produce the sealing and encapsulating qualities of the cementitious material 6 and coating sealant 7.

The suggested starting formulation for the admixture is based upon the degree of encapsulation of asphalt which is desired. When there is a high percentage of asphalt, say, 10%, encapsulating the aggregates (RAP), a high ratio of admixture to cement should be used, such as 20% by weight of the admixture to the weight of the cement. These high ratios of asphaltic coatings of RAP are typical of newly-paved asphalt roads.

As an asphalt road ages, say over a period of five years (an accepted lifespan for an asphalt road, after which it will require resurfacing), the road's hydrocarbon content is substantially reduced. This reduction is caused by environmental factors such as the ultraviolet light from the sun, rainwater, freeze-thaw cycles during a winter period, de-icing chemicals such as salt spray, road wear by vehicular traffic, and the evaporation of volatile hydrocarbon components from the asphalt as the pavement ages.

It is expected that asphalt content will diminish by 2–3%. Accordingly, the preferred ratio of the admixture to cement for these older roads is 10%.

The ratio of water to cement for pavement having a high content of recycled asphalt product (RAP) is 35% by weight.

The ratio of water to cement for roads having a low content of recycled asphalt product is 40% by weight.

The volumetric proportions of the cementitious coating 6 and the second coating sealant 7 can be increased depending upon the amount of asphalt 3 coating the aggregate 1 and sand 2. The amount of asphalt 3 may be selected using standard laboratory testing procedures, such as "Sampling Asphalt Products for Specifications Compliance" (MS-18) AASHTO (American Association of State Highway and Transportation Officials) Method of test T40 and ASTM Method of TEST ?140.

Although a wide variety of materials can be used in practicing this invention, the following discussion of various exemplary constituents of environmental pavements may be of interest.

It is preferable that the admixtures used to form pavement materials and pavement constructions according to this invention be liquid, have a solid content of acrylic about 47% by weight. The balance of the admixture is water, and the admixture has a pH of 9.3–10.2, specific gravity of 1.059, and an absolute viscosity of about 1.5 dynes-seconds/100 cm².

It is preferable to use sand or fine aggregate of the type set forth in the following table

| Sand or Fine Aggregate | |
|---|---|
| Sieve Size | Percent Passing |
| #4 | 0–5 |
| #8 | 0–15 |
| #16 | 3–35 |
| #30 | 30–75 |

-continued

Sand or Fine Aggregate

| Sieve Size | Percent Passing |
|---|---|
| #50 | 65–95 |
| #100 | 93–100 |

The fine aggregate (sand) should be reasonably well-graded from course to fine and when tested by means of laboratory sieves, it should meet the above-requirements, in percent of total weight.

It is also believed to be preferable to use aggregate having as narrow a size distribution as possible—in other words, all of the aggregate particles should be of the same size. #30 size material is thought to be preferred. This observation was made during development of this invention, wherein it was discovered that porosity could be maximized by making all of the pavement particles the same size. Likewise, it is thought to be preferable for the aggregate particles to be as close to spherical in shape as is possible.

So too, it is thought that the preferred asphaltic material to be used with this invention is AC-5 Grade Asphalt Cement (contained in RAP), having a viscosity at 140° F. (60° C.) of 500 poise, a viscosity at 275° F. (135° C.) of 175 Cs and a measured penetration at 77° F. (25° C.) for 100 gms over a 5 second period of 140. The flash point (COC°) of this material is 350° F. and its solubility in trichloroethylene is 99.0%.

Moreover, it is preferred that the Portland cement used with this invention be any of types I, II or III, as specified in AASHO M 85, or type IS, as specified in AASHO M 151.

The water to be used in preparing the paving material should come from approved municipal water supplies. Water from other sources should be tested and confirmed suitable before use, and it should not contain impurities in excess of the following limits: acidity should be no more than 0.05%, the total amount of organic solids not be more than 0.05%, the total amount of inorganic solids be less than 0.08%, and the total amount of chloride or sodium chloride be less than 0.05%.

The size of the large aggregates, including recycled asphaltic products (RAP), should be $\frac{3}{8}$ (9.52 mm) ±10%, for screened material. Smaller aggregates produce a lower coefficient of friction and larger aggregates produce a higher coefficient of friction, although this also results in greater road noise. Again, it is believed to be preferable for the aggregates to be selected so as to have as narrow a size distribution as possible, and to be as close to spherical in shape as possible.

It should be noted that the sand 2 and stone aggregate 1, both of which have asphalt coatings 3, as shown in FIG. 3, can be produced by milling, crushing and screening of existing polluting roadway material, for example, roadbeds. Alternatively, fresh raw material could be used. This can be done using commercially available milling, crushing, and screening equipment. A wide variety of milling, crushing and screening machines are known, and which perform with varying degrees of automation and control. Thus, applicability and control of a particular piece of equipment for milling, crushing and screening of recycled asphalt material can be determined by the nature of the recycling project and the degree of automation desired. This invention does not require the use of any specific piece of processing or construction equipment, and all devices are intended to fall within its scope.

The inventors have found that using prior art devices, such as transit mix trucks, mobile mixers, and other similar types of commercially available equipment, poor results were obtained in the mixing operation. These devices produced non-homogenous mixes, and created the problems that have been described previously. The mixer described in this application can produce conventional concrete as well as porous pavement material according to the invention described herein. Even using this mixer to produce conventional concrete will be beneficial because that conventional concrete will be produced with greater homogeneity.

Accordingly, this invention also includes a mixing machine for use in manufacturing the homogenous environmental porous pavement material previously described. This machines is depicted in FIGS. 10A–E, and is described hereinafter.

Figure 10A:
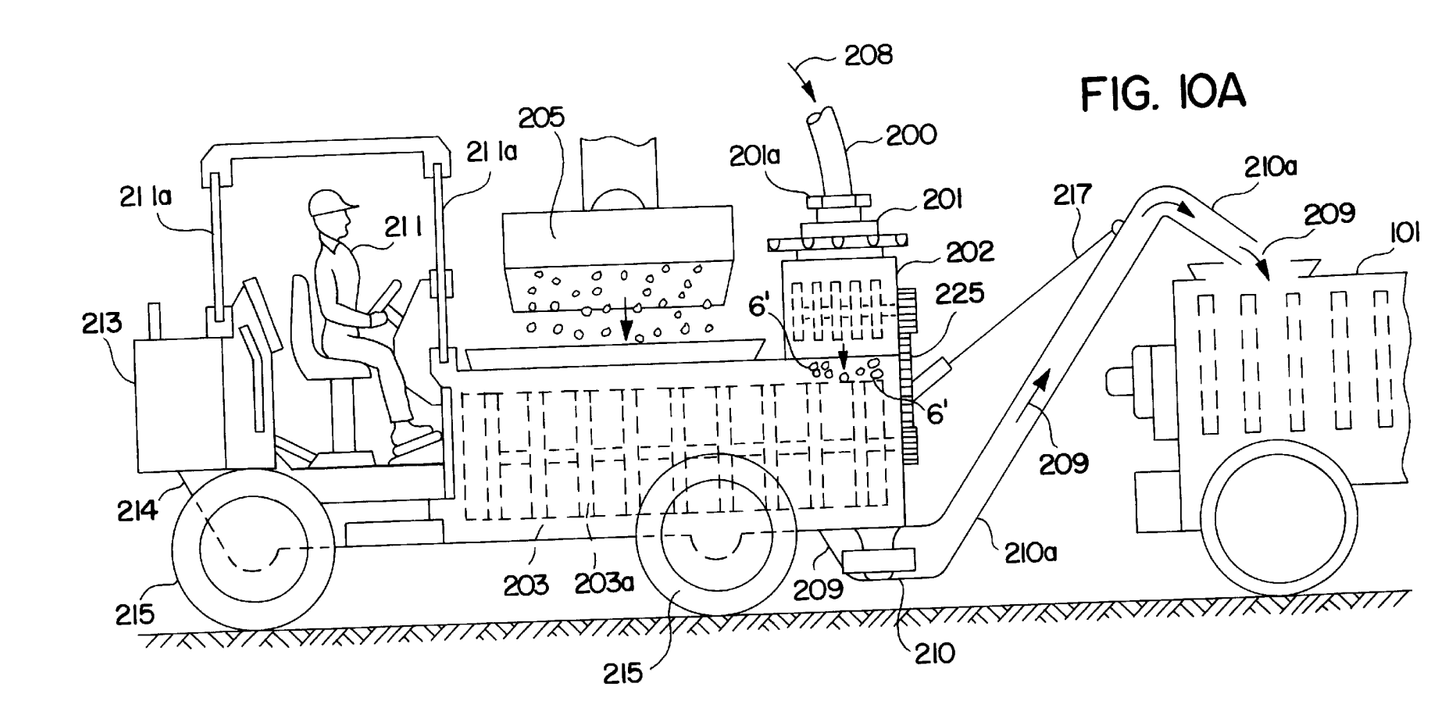
FIG. 10A is a side elevational view of a mixing machine in accordance with this invention.

A mixing machine for use in practicing this invention is shown in the elevational view of FIG. 10A. This mixing machine is especially useful for producing porous pavement materials, such as those of the type described in U.S. Pat. No. 3,870,422 to Medico, Jr.

The mixing machine proposed in this invention is particularly useful for mixing environmental porous pavement, since this machine allows precise control of the admixture, water and cement ratios, as well as precise control over the volume of the admixture, water and cement, which form the cement coating of the asphalt covered aggregate (RAP), and which has been described previously.

Figure 10B:
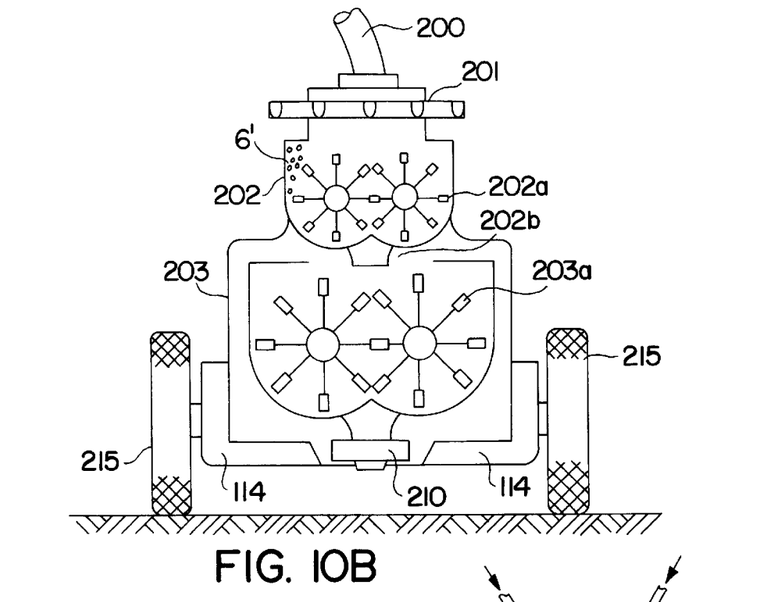
FIG. 10B is a front cross-sectional view of a mixing machine as seen along lines 10B–10B of FIG. 10A.

As shown in FIG. 10A, Portland cement flows through hose 200, which hose is attached by clamping or screw coupling 201d to the spray head assembly 201, and is located atop the cementitious mixing assembly 202. As shown in FIG. 10B, the mixing assembly 202 has paddles 202a to churn the material being mixed. These two assemblies, 201 and 202 respectively, are attached to the top of the large mixing assembly 203, which is loaded with aggregates, sand and gravel 204, collectively, or with recycled asphaltic product (RAP). The large mixing assembly 203 is loaded by means of material handling equipment 205, such as front loaders, conveyor belts, batching silos or any other suitable materials handling equipment, both of the types now known, and any types which may be developed hereafter. The cement 208 is loaded by means of the base 200 into the mixing assembly 202. The water 206 and the admixture 207 combine in the ring pipe 201a.

When the contents of the mixing assembly 202, sand and aggregate 204, are mixed with water 206, admixture 207, and cement 208, they form cementitious coatings 6 and 6', respectively, which combine to form environmental porous pavement material 209. The mixing of the cement 208 with the water 206 and admixture 207 takes place within the mixing assembly 202, and forms the cementitious coating 6, as shown in FIG. 3.

This cementitious coating 6' drops down into the large mixing assembly 203 where it combines with sand and aggregate during the mixing operation. This mixing operation, which is performed by counter-rotating paddles 203a, causes the cementitious coating 6' to encapsulate the aggregate, sand and gravel 204, or the recycled asphaltic product (RAP).

This RAP material contains completely covered asphalt or partially coated asphalt that was previously coated at the asphalt plant.

If desired, particles of aggregates composed of ordinarily polluting asphalt could be used alone in the mixing operation just described, and those aggregate particles would be encapsulated with the cementitious coating 6', thereby rendering it environmentally safe.

An optional second coating sealant 7 may be provided when the completed mixture is still in the large mixing assembly 203, for example, by means of the spray head assembly 201.

The environmental porous pavement material is fed to pump 210, and in turn, through tubes 210a, which deliver the material 209 to the paving machine 101. Although it is preferable for this paving machine to be the paving machine described elsewhere in this disclosure, and depicted in FIGS. 8A and 8B, other paving machines also could be used, including conventional devices.

The mixing machine in FIG. 10A is driven by operator 211, who has a clear view of the loading and mixing operations through the window 211a. The operator sits on a pedestal seat 212, which can be swivelled and otherwise positioned so that the operator can control the mixing machine with ease as it moves to desired locations. The mixing machine can be powered by engine 213, which drives hydraulic system 214, counter-rotating paddles 203a, and pump 210. The self-propelled mixing machine rides upon wheels 215, but of course could instead ride upon treads. 10B depicts the counter-rotating paddles 202a in the cementitious fixing assembly 202 which can be driven by chain drive or pulley 225, which cooperates with drive wheels 215 and the hydraulic cylinders which control the supporting cable 217 of tube 210.

Figures 10C, 10D, 10E:
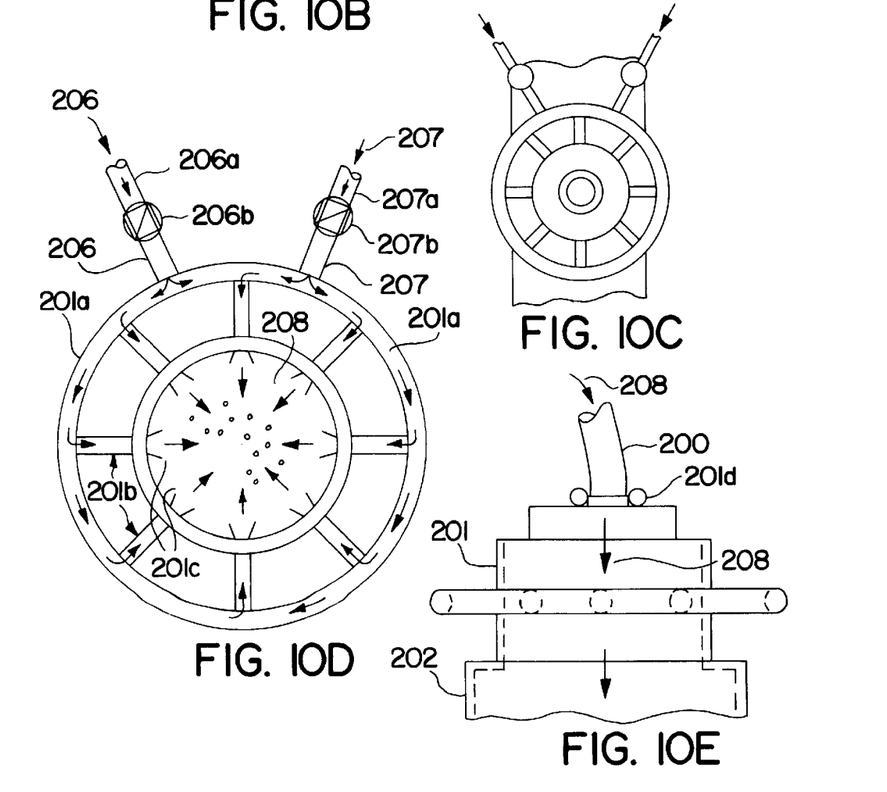
FIG. 10C is a top view of the spray head shown in FIG. 10A.
FIG. 10D is an enlarged schematic view of the spray head with its cover removed.
FIG. 10E is a side view of the spray head.

Homogenous mixing of pavement material starts at the spray head assembly 201 where cement 208, such as Portland cement, enters through hose 200 under pressure from a supply tank and blower, which are themselves well-known and commercially available, and so are not shown. As the cement 208 enters the spray head assembly 201, water 206 enters ring pipe 201a under pressure through water pipe 206a and check valve 206b. Once water 206 enters ring pipe 201a, it continues through radial pipes 201b, and finally passes through the spray nozzles 201c, where water 206 becomes a mist spray. This spray of water then combines with the incoming cement 208, and is shown as dots at the center of the spray head assembly 201.

Admixture 207, which can be a liquid polymer acrylic, enters pipe 207a through check valve 207b, and also flows through ring pipes 201 into radial pipes 201b, and then through the spray nozzles 201c, where the admixture combines with cement 208 to form a partial cementitious mixture. Complete mixing occurs when this partially mixed cementitious mixture enters the mixing assembly 202, where mixing occurs with the action of the counter-rotating blades 202a. Control gate 202b regulates the flow of this completely-mixed cementitious material as it drops into the mixing assembly 203, where it is caused to encapsulate aggregates 1 through the action of the counter-rotating blades 203a. The optional second coating sealant 7 is provided by increasing or decreasing the volume of admixture 207 entering spray head 201.

It has been determined that the amount of admixture added to the water 206 through the sprayhead assembly 201a does not affect the porosity of the mix design. The function of the admixture 207 is to produce the sealing and encapsulating qualities of the cementitious materials 6 and 7.

This machine is intended to be suitable for with a range of materials, and preferably to be used to process materials of the types already discussed in connection with both the paving material and road construction techniques already discussed. Thus, the machine itself is not to be so limited, and it could nevertheless be used with other raw materials, and with other process conditions.

Figures 5, 6:
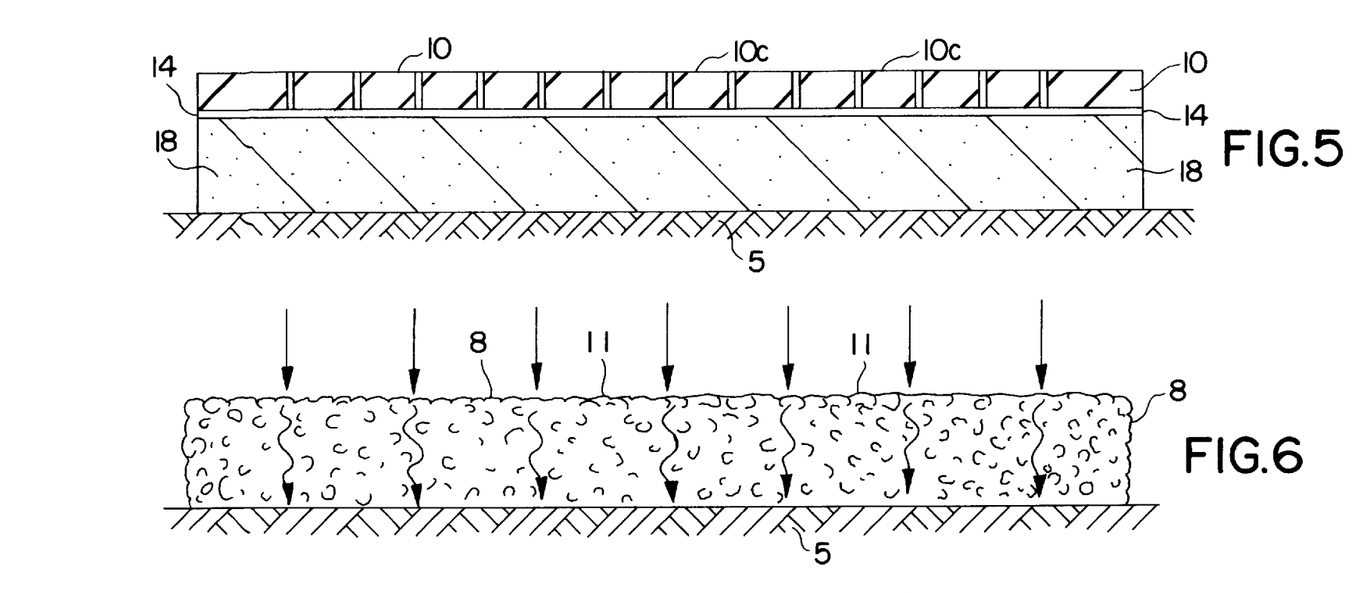
FIG. 5 is a cross-sectional view of an overlayment according to the present invention used with a pre-existing roadbed.
FIG. 6 is a cross-sectional view of a roadbed made from porous pavement according to the present invention.

FIG. 6 shows pavement made from the recycled porous pavement which has already been described in connection with FIGS. 2 and 3. This embodiment does not have a predetermined internal structure, by which it is meant that the layer of pavement is relatively homogenous. This is in contrast to formed structures having predetermined internal structures, which structures will be discussed hereinafter. Examples of such structures include a porous aqueduct hollow core base and a porous rubber overlayment friction course.

Figure 4A:
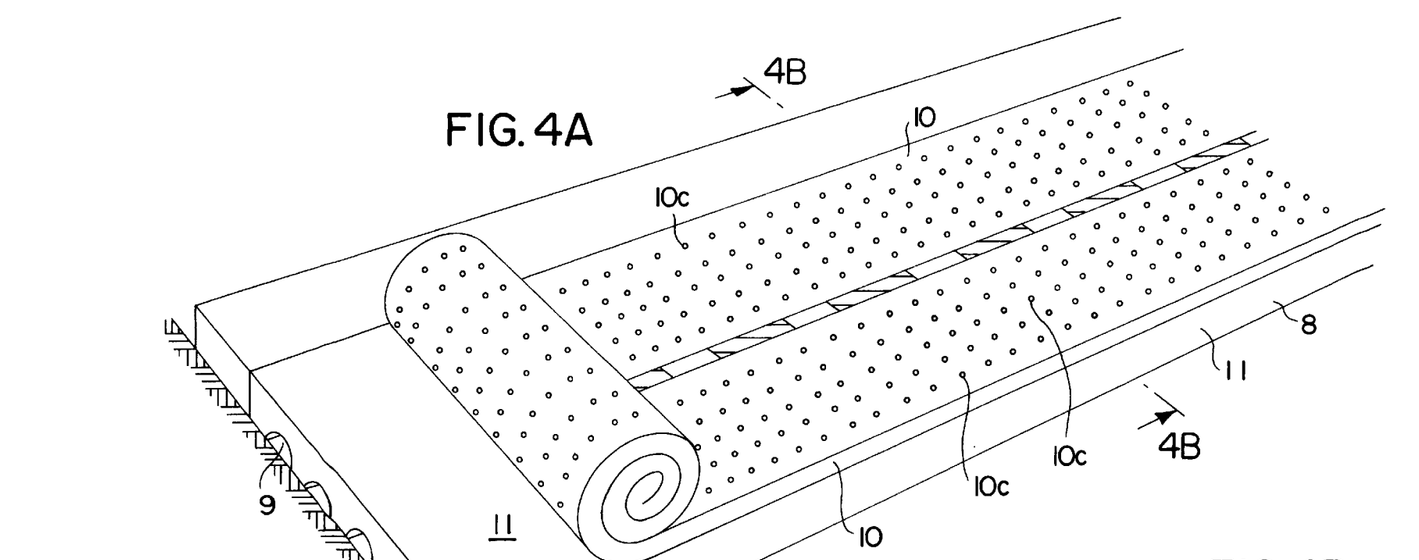
FIG. 4A is a perspective view showing a roadbed constructed according to the present invention.
Figure 4B:
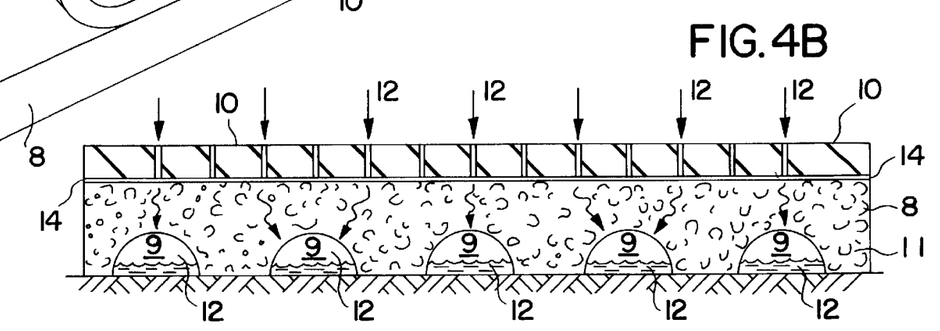
FIG. 4B is a front cross-sectional view of the roadbed depicted in FIG. 4A.

FIGS. 4A and 4B depict examples of environmental porous pavement 11 which contains elements corresponding to those depicted in FIGS. 2 and 3, as well as various other novel features of this invention. Such pavement is preferably constructed in accordance with the material requirements just set forth. The pavement 11 has a porous hollow aqueduct core base 8, which base 8 is described in greater detail hereafter. The pavement is designed to provide for stormwater drainage. Although the pavement can be formed by a paving machine, such as the paver which will be described, alternative methods of construction, including hand fabrication, could also be used. A solid state roll or sheet porous rubber overlayment 10 is placed atop the base 8, and this overlayment provides a friction course for the environmental porous pavement 11. Stormwater, whether from rain, melted snow or any other source, can percolate through the overlayment via holes 10c to the environmental porous pavement 11. Overlayment 10 is discussed in greater detail below.

The core base 8 contains a number of aqueduct channels 9. As shown in FIGS. 4A and 4B, the aqueduct channels are arch-shaped, but other shapes, such as round, square, rectangular, triangular, oval, crescent, semicircular, or arched, also could be used. Precipitation falling on the porous road percolates as a liquid through the porous pavement material and enters the aqueduct channels 9. Once inside the channels 9, the water can flow under the influence of gravity or, if necessary, can be pumped.

The channels can be dimensioned and disposed so that they extend downward to the sub-soil 5 underneath the core base 8; this way, water entering the channels 9 can percolate directly downward into the sub-soil.

Although the embodiments of this invention are shown with elongated channels, other channel structures might be used. For example, shorter channels not communicating with one another, much like the air cells in a sponge, could be used.

Among the benefits of using the integral porous hollow aqueduct core base 8 is that it is no longer necessary to provide for storm drainage pipes and storm inlets of the type which are used to control water flow in conventional roads. Alternatively, such structures could be provided, although in reduced sizes.

A wide variety of conventional pavement construction techniques could be used with this aspect of the invention. For example, reinforcing rods could be disposed among the pavement particles. Plastic coated reinforcing rods, which are commercially available, and are thought to be especially useful for this invention. The plastic coating would serve to limit the rust that occurs on unprotected rods.

By recycling existing polluting asphalt roads to form the pavement materials and structures shown in FIGS. 2–4A and 7, roads and parking lots can be formed from recycled porous pavement material, and be constructed with integral porous aqueduct hollow-core bases, whereby stormwater flooding can be greatly reduced. The porous pavement material and aqueduct core roadbed together provide for improved stormwater drainage. A further benefit of this invention is that stormwater can percolate through to the sub-base of the road bed, and so enter the ground water aquifer. This reduces the amount and flow of water on the pavement surface, which decreases flooding.

Figure 7:
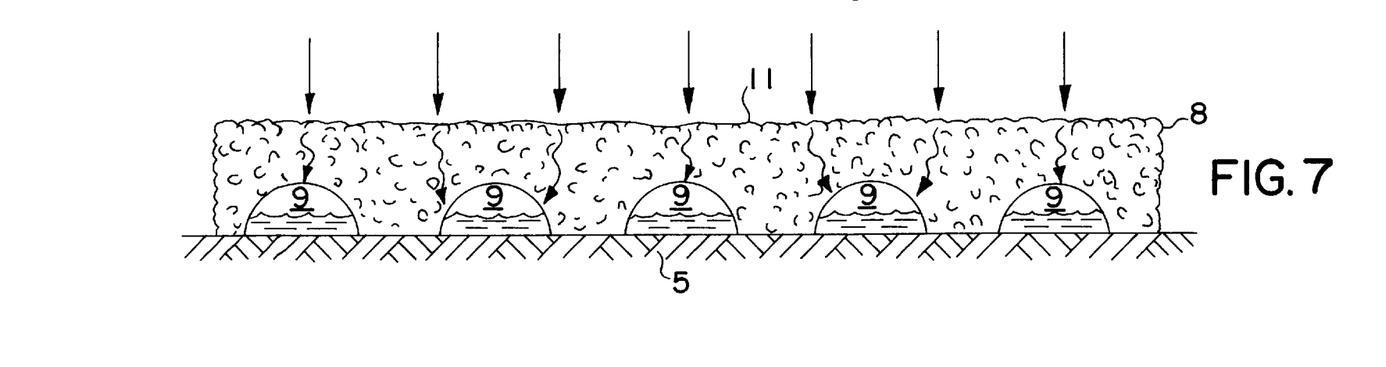
FIG. 7 is a cross-sectional view showing a roadbed made from porous pavement according to the present invention having an aqueduct structure according to the present invention.

FIG. 7 depicts the porous pavement with aqueducts 9 and other features already discussed in connection with FIG. 4. Optionally, reinforcing rods (not shown) can be provided. It differs from FIG. 4 in that it does not contain a porous rubber mat or sheet overlay.

Although the aqueduct core roadbed described above in connection with FIG. 4 is believed to be preferable, the porous pavement material also can be used to form a conventional road made from a relatively homogenous layer of material. As depicted in FIG. 6, the porous pavement material can be applied in a conventional manner using conventional paving equipment. While the road shown in FIG. 6 will not have the ability to provide longitudinal stormwater drainage in the manner of the embodiment shown in FIG. 4, it still will allow for vertical stormwater percolation to the sub-soil 5 below the road. Thus, the embodiment shown in FIG. 6 will also reduce skidding and hydroplaning.

As previously noted, many skidding accidents occur because water has accumulated on the road surface, in turn, leading to hydroplaning. This problem is solved by the use of porous pavement, because standing water is virtually eliminated from the road surface 11 of the porous pavement. Porous pavement therefore reduces conditions which would otherwise lead to skidding and hydroplaning. There are, moreover, a number of additional solutions to such drainage problems.

A further aspect of this invention involves the provision of a solid state roll or sheet of a porous rubber overlayment material 10, which is shown in FIGS. 4A, 4B, 5 and 9A–C. This overlayment material 10 rests atop the road core 8, and serves as a friction course of the road bed 11. Overlayment 10 can be held in place by a non-polluting adhesive, such as acrylic adhesive 14, preferably atop a recycled asphalt porous pavement structure course, as shown in FIGS. 4 and 5.

Figures 9A, 9B, 9C:
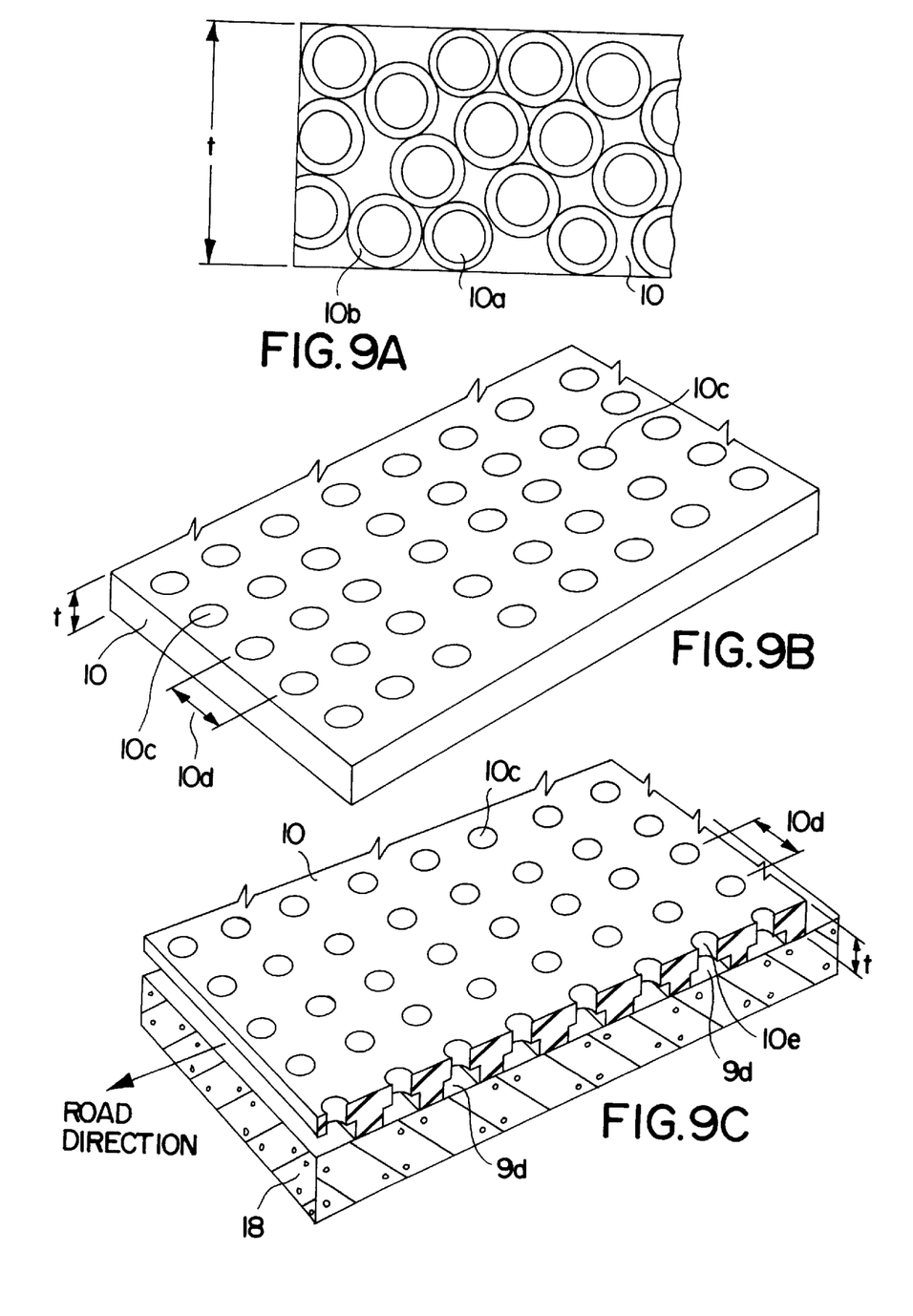
FIG. 9A is a cross-sectional view of a porous rubber overlayment friction course.
FIG. 9B is a perspective view of the overlayment friction course of FIG. 9A.
FIG. 9C an embodiment of the rubber overlayment friction course containing grooves on its underside.

The solid state roll or sheet porous rubber overlayment friction course 10 can be made from recycled rubber tire particles 10a which are bonded by a polymer binding component 10b. One example of an overlayment friction course 10 having this structure is shown in FIGS. 9A–C.

Particles falling within the range of 1/8"–1/4" (3–6 mm) are preferred. Examples of materials useful as binders include liquid polymers, such as polyurethane, polyether and polyester, and these materials are available from various rubber manufacturers and chemical companies.

EXAMPLE 5

One formula for the solid state roll or sheet porous rubber overlayment friction course 10 is as follows (the ratios given are volumetric ratios):
  one (1) part of polymer adhesion binder by volume; and
  three (3) parts by volume of recycled rubber particles.
    Such particles could be about 1/8"–1/4" (3–6 mm) in size.
    The distribution of particle sizes could be controlled at the recycling rubber tire plant where such particles are produced.

The solid state roll or sheet for the porous rubber friction course 10 can be formed using a variety of known manufacturing processes, such as an extrusion process, compression molding process, injection molding process, or casting process. These are all well-known manufacturing processes and so need not be described further herein. One material believed to be particularly suitable for use in forming the porous rubber friction course 10 is the material PROLASTOMER®, which is produced by the SYNTENE® company of Richmond Ind. This material is a thermoplastic rubber made from a polymer matrix and recycled rubber.

These processes use heat to form the finished product, with the amount of heat and other process conditions being selected according to the type of equipment, the design mix formula, and the manufacturing process selected.

Although it is thought to be preferable to install the solid state roll or sheet porous rubber overlayment over the porous aqueduct hollow-core base made of porous pavement, the overlayment also could be installed over conventional surfaces and road designs. FIG. 5 shows a solid state roll or sheet porous rubber overlayment friction course 10 placed over an existing roadbed 18 made from a conventional asphalt or concrete pavement material.

It is advantageous to be able to mount the overlayment friction course 10, which is provided in the form of a porous solid state roll or mat made of porous rubber, over an existing roadbed friction course 18 made of conventional asphalt or concrete pavement. This results in a virtually non-skid surface, and the porous rubber overlayment 10 can be rapidly installed over an existing friction course made of conventional asphalt or concrete pavement, that may be in need of repair. This prefabricated surface structure thereby allows for the rapid treatment and/or repair of damaged road surfaces, such as the patching of potholes in existing roads. The speed with which repairs can be effected is of particular concern where there are heavy traffic conditions. No elaborate paving equipment is required for overlayment of the sheet or mat. Unlike conventional asphalt pavement friction courses, which require heating of the asphalt products being applied, the porous rubber sheet or mat can be laid at any temperature. Of course, it will be appreciated that moderate temperatures may be preferred, since the overlayment material can be handled more easily at warmer temperatures. Finally, the porous rubber sheet or mat is a safer surface for vehicles, since as shown in FIG. 5, surface water is squeezed away from the vehicle tires, thereby reducing skidding and hydroplaning.

Another configuration of the porous or perforated overlayment friction course 10 is shown in FIG. 9C with overlayment 10, containing grooves 9a on the underside that run the complete width of the overlayment 10. It is seen in this configuration with a perforated overlayment 10. The holes 10C intersect the grooves 9a so that rainwater entering the holes 10c passes into the grooves 9a. Since these grooves run transverse to the road direction as shown in FIG. 9C, the water 9d will naturally drain toward the sides of the road because the road structure slopes to the side of the road. The depth and width of the grooves depend upon the thickness, t, of the overlayment 10. However, the maximum depth of these grooves could be one-half the thickness of t of the overlayment. The centerline to centerline distance would be $2t$, $3t$, $4t$ etc. depending upon the anticipated average or maximum rain intensity.

A further benefit to the use of the grooved overlayment 10 is that the overlayment can be formed with grooves which will contain wiring, whether electrical or fiberoptic, for road sensors and/or control systems. For example, traffic sensors embedded in the roadway could be linked to a computer, and the computer linked to traffic signals, via wiring running beneath the overlayment. Such grooves can be formed in the overlayment either by machining the finished overlayment, or by manufacturing the overlayment in an extrusion process which forms the grooves.

It also will be appreciated that this aspect of the grooved overlayment is particularly useful for the implementation of "smart" roads, in which vehicles will be operated under automatic control. Automatic operation will require a substantial number of sensors and control systems, and it will be simpler to place such sensors and systems beneath the overlayment than to place them into trenches cut in the pavement itself.

Another advantage of this friction course 10 is that it can be made from post-consumer recycled (rubber tires) and so will have a molecular structure similar to the structure of the vehicle tires rolling on it. This combination of similar materials produces optimal conditions braking a vehicle, since the coefficient of friction between the like surfaces is maximized.

Another benefit to using the friction overlayment is that it offers a high coefficient of friction. A high cost of friction, of course, means improved vehicle handling. In contrast, conventional asphalt and concrete roads are composed of stone aggregates and sand, which become polished by vehicle traffic, reducing the coefficient of braking friction between the tire and the roadbed. In the case of the asphalt road, which contains oils, those oils further reduce the coefficient of braking friction between tires and the roadbed, because the oils act as lubricants, reducing the coefficient of friction.

An alternate configuration for the solid state roll or sheet porous rubber overlayment friction course 10 is to form the overlayment in solid sheets and later perforate the sheet with numerous holes 10c, either on or off the construction site. The porosity of the perforated sheets can thereby be made similar to that of the porous rubber mat 10, previously described.

Perforation process for forming perforated rubber sheets are known, and so need not be described in further detail herein.

The perforations can be made with various diameters and be disposed in various patterns. For example, typical hole sizes could range from $1/16"-1/4"$ (1.58 mm–6.35 mm). In any event, the optimal patterns and hole sizes can be determined for any given installation on an individual basis through suitable testing. The spacing of these perforated holes can vary, depending upon the diameter of perforations. The spacing of these perforations can be made multiples of the diameter of the perforations, such as 3×, 4×, 5× the perforation diameter. The precise spacing used can depend upon the desired rate of water percolation. Examples of the hole distribution patterns include random spacing and regularly-spaced rows and columns. It is contemplated that all possible patterns and opening sizes fall within the scope of this invention.

Another option would be not to provide any perforations. This arrangement might be preferable in areas that are normally well-drained with catch basins and pavement slopes, where it is more important for the road to have a high coefficient of friction to allow more effective vehicle braking, and also to minimize conditions that produce potholes. Using a solid-state roll or sheet rubber overlayment friction course would be ideal in such conditions, say, at a corner in Times Square, in New York City, or at approaches to toll booths, such as entrances to a bridge.

Future roads can also be improved by sending heated air or other fluid through the aqueducts 9, to melt ice and snow which has accumulated on the road surface 11. Beyond the immediate improvement in safety, the need for snow removal equipment can be minimized, or possibly even eliminated. Thus, another aspect of this invention is an all-weather system which facilitates driving during winter months, when snow and ice would otherwise result in hazardous driving conditions.

This invention also involves a paving machine which can form the aforementioned aqueduct road core structure. As shown in FIGS. 8A–D, such a machine can be constructed by modifying conventional paving equipment. A wide variety of paving machines and related devices are known, and examples of such paving machines can be found in manufacturer's industrial catalogs. This embodiment of the present invention involves modifying a conventional paving machine material hopper to include a mixer 101 which forms the porous pavement particles. The mixer 101 consists of a pair of elongated, counter-rotating, mixing blades 103.

Figure 8A:
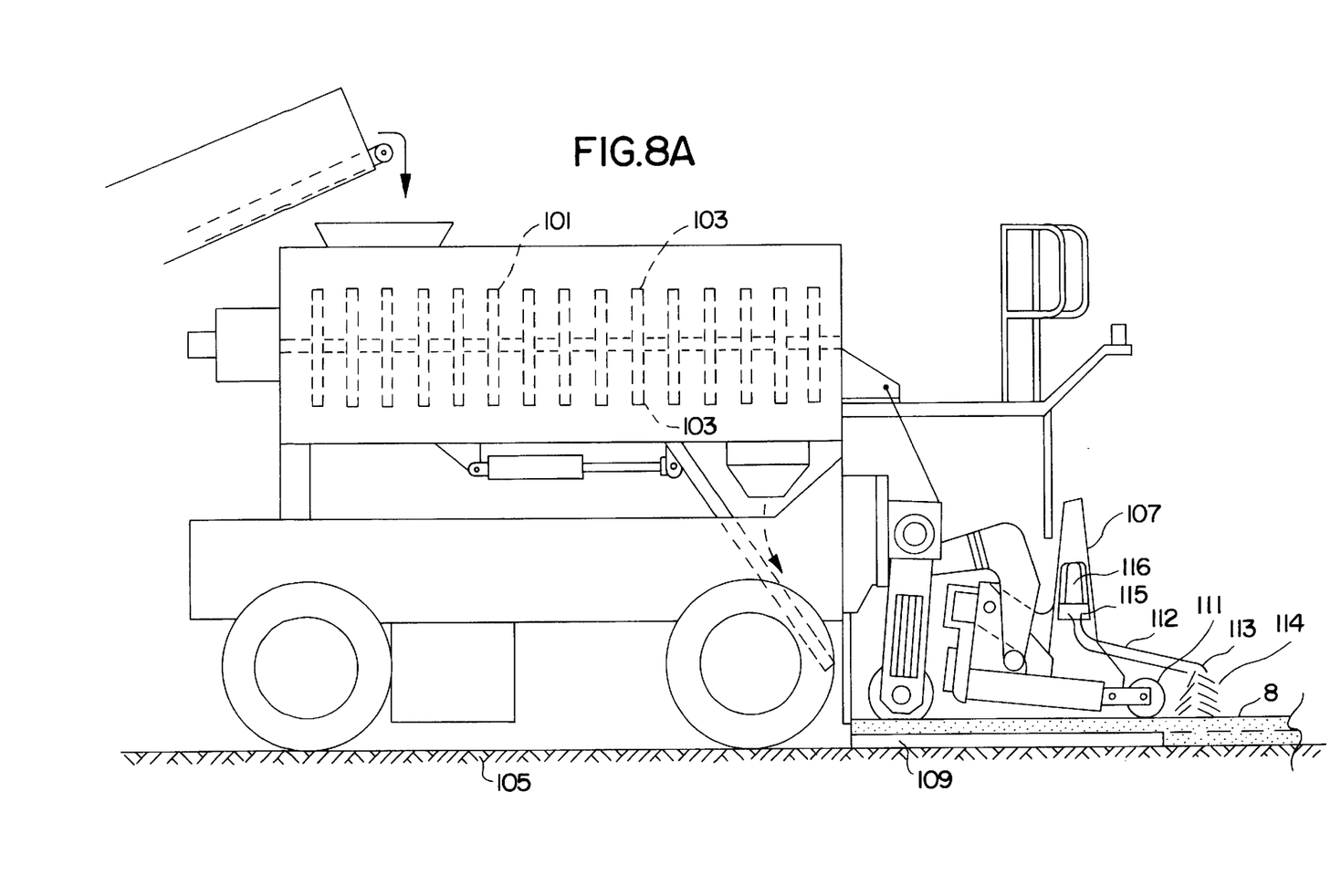
FIG. 8A is a side elevational view of a paving machine for producing pavement according to the present invention.
Figures 8B, 8C, 8D:
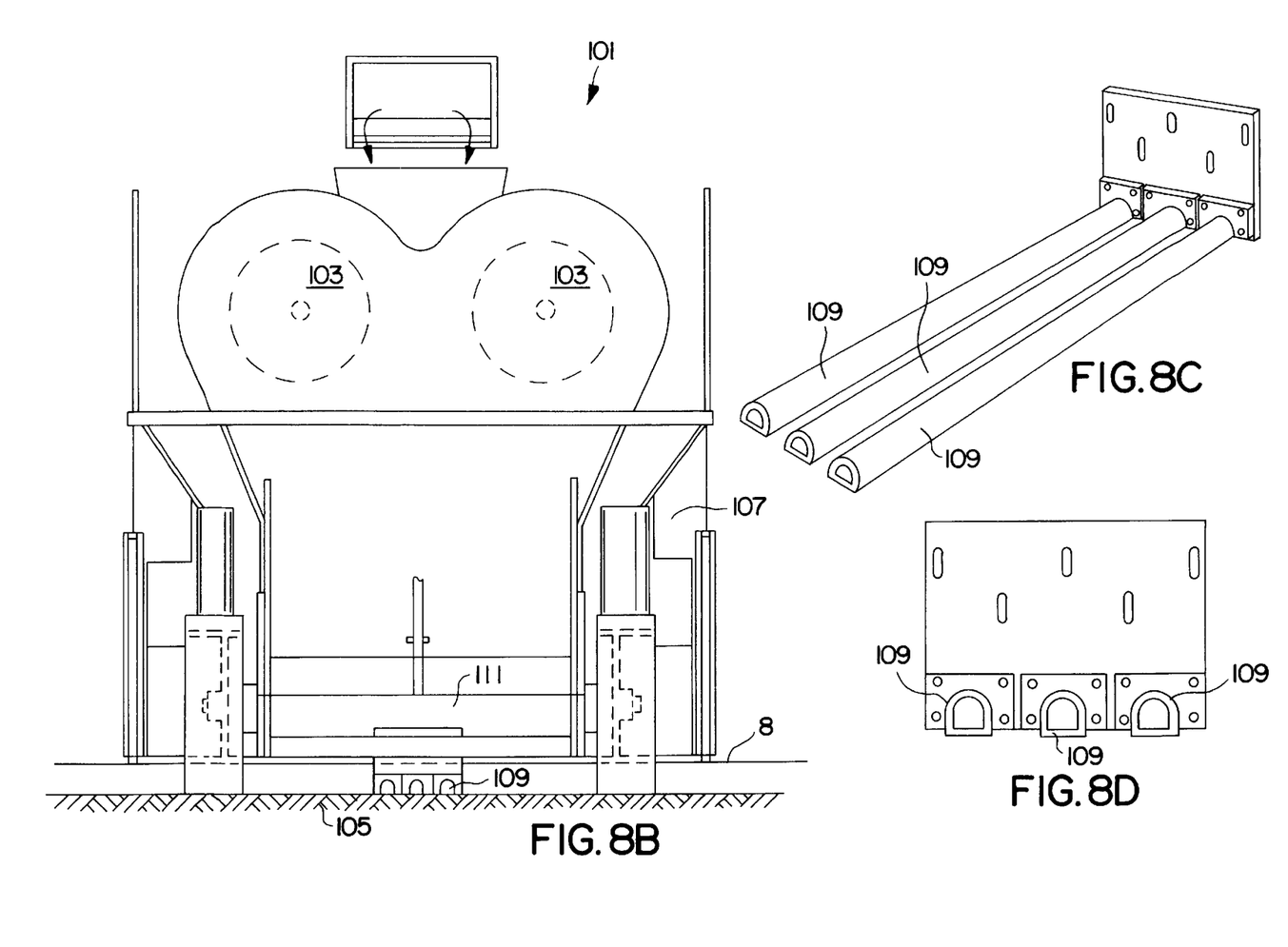
FIG. 8B is a rear elevational view of the paving machine shown in FIG. 8A.
FIG. 8C is a perspective view of the portion of the screed assembly of the paving machine shown in FIG. 8A which produces an aqueduct structure in pavement.
FIG. 8D is a rear elevational view of portion of the screed assembly shown in FIG. 8C.

The mixer 101 is used to produce a homogeneous mixture of asphalt, preferably recycled, in the manner discussed previously in this application. The mixing blades 103 also maintain the flowability of the paving particles.

Process conditions and starting materials are preferably selected in the same fashion as those previously discussed in connection with the pavement materials according to this invention, as well as those described hereinafter. In particular, such conditions are discussed in detail in connection with the explanation of the mixing machine according to this invention.

The mixed pavement particles are applied atop the subsoil 105 using a paving machine of the type shown in FIGS. 8A–D. Some of the components of this paving machine are conventional paving machine components (i.e., chassis, conveyor and pumping equipment for feeding paving material from the hopper to the screed), and these components serve to feed the particles to a specially-designed screed 107. As seen in FIGS. 8A–D, screed 107 has a number of substantially-parallel, regularly spaced aqueduct forming rods 109 attached thereto. These rods, which are oriented along the axis of movement of the paving machine, serve to form the aqueduct shape 9 in the base 8 of the road, which as previously noted is made of porous pavement.

The pavement is formed by continuously depositing a mass of pavement particles onto the forming rods 109 as the paving machine moves forward. The forming rods thereby serve to create elongated aqueduct cores under the road surface. In addition, it may be desirable to form the forming rods 109 with a taper so that they narrow away from the screed. Forming rods 109 may be rotated and/or heated, in order to improve release of the pavement material as the paving machine advances. Optionally, a leveling roller 111 rides atop the pavement near the end of the forming rods. The leveling roller 111 extends over the complete width of the pavement being formed, and bears downward against the pavement surface to produce a smooth finish, insure the required amount of pavement material compaction, and cause the aqueduct core to have the proper shape.

The downward force can be applied with hydraulic pistons or by mechanical linkage and spring means. Such pressure causes the roller to smooth out and level top aggregates that may become loose in the paving process. The appropriate amount of pressure is determined visually, by inspecting the quality of the top finish. Any necessary adjustments can be made to produce the optimum finish.

In addition, a system for applying coating liquid to the pavement material is provided (that is, an applying means for applying a treating agent). As shown in FIG. 8A, this system uses fogging spray nozzles 113 located beyond (behind) the roller 111 to coat the finished pavement with a fog or mist spray of curing compound 114. The curing compound is carried via delivery pipes 112 from a curing compound reservoir 115 through the action of dispensing pump 116. The fogging spray nozzles thereby serve to coat the finished pavement with curing compound.

The curing compound, which is withdrawn from the reservoir 115 and forced through the nozzle 113 under pressure by the dispensing pump 116, emerges as a spray, and this spray can be adjusted at either the nozzle and/or the pump to ensure a fine mist spray. The quantity of curing compound may be adjusted so that the top layer of the pavement does not become overloaded, which would produce an impervious surface, and the preferred amount and size of the mist can be determined empirically.

The curing compound serves to control and reduce the evaporation rate of the pavement material using its hydration or curing process. There are many commercially available curing compounds available on the market. They are basically liquid plastics such as liquid acrylics, liquid latex and other polymers.

Other variations and modifications of this invention will be apparent to those skilled in this art after careful study of this application. This invention is not to be limited, whether by materials, constructions and/or procedures, save as set forth in the following claims.

What we claim is:

1. A pavement construction, comprising:
    a layer of pavement material having a surface and a plurality of self-supporting channels formed beneath said surface, said pavement material comprising;
        a plurality of pavement particles, each said particle comprising,
            an inner body,
            a cementitious coating surrounding at least a portion of said inner body, and
            an asphalt coating disposed between said inner body and said cementitious coating, and surrounding at least a portion of said inner body,
        wherein said pavement particles form said layer and said layer has a plurality of voids at least some of which are disposed between adjacent said pavement particles.

2. A pavement construction as in claim 1, wherein at least some of said self-supporting channels have a cross-section which is selected from the group consisting of round, square, rectangular, triangular, oval, crescent, semicircular, or arched.

3. A pavement construction as in claim 1, wherein said inner body is selected from the group consisting of limerock, granite, hard stone, sand and recycled concrete.

4. A pavement construction as in claim 1, wherein said self-supporting channels are dimensioned and disposed so that a portion of a surface underlying said layer is exposed within said self-supporting channels.

5. A pavement construction as in claim 1, wherein said self-supporting channels are substantially parallel to one another.

6. A pavement construction as in claim 1, wherein said asphalt coating comprises recycled asphalt.

7. A pavement construction as in claim 1, further comprising a filler which at least partially surrounds said pavement particles.

8. A pavement construction as in claim 7, wherein a plurality of cavities are present in said filler.

9. A pavement construction, comprising:
    a layer of pavement material having a surface and a plurality of self-supporting channels formed beneath said surface, said pavement material comprising;
        a plurality of pavement particles, each said particle comprising,
            an inner body, and
            a cementitious coating surrounding at least a portion of said inner body,
        wherein said pavement particles form said layer and said layer has a plurality of voids at least some of which are disposed between adjacent said pavement particles; and
        a plurality of overlayment particles, each said overlayment particle comprising;
            a rubber core, and
            a polymer binding component surrounding at least a portion of said rubber core,
        wherein said pavement particles are formed in an integral, self-supporting sheet which has a plurality of holes formed therein, said holes running from a top of said sheet to a bottom of said sheet.

10. A process for making a pavement, comprising the steps of:
    providing a plurality of pavement particles;
    forming the pavement particles into a layer of porous pavement material having a surface and a plurality of voids at least some of which are disposed between adjacent said pavement particles, and, as the layer is being formed;
    forming a plurality of self-supporting channels formed beneath the surface of the layer; and
    providing a plurality of elongated forming arms,
    wherein said step of forming the plurality of self-supporting channels beneath the surface of the layer comprises shaping the pavement particles around the elongated forming arms.

11. A process as in claim 10, wherein the self-supporting channels are substantially parallel to one another.

12. A process as in claim 10, wherein at least some of said self-supporting channels have a cross-section which is selected from the group consisting of round, square, rectangular, triangular, oval, crescent, semicircular, or arched.

13. A process as in claim 10, further comprising the step of rotating the elongated forming arms.

14. A process as in claim 10, further comprising a step of applying a treating agent to the pavement material.

15. A process as in claim 14, wherein said applying step is performed after said forming of the pavement particles into the layer.

16. A process as in claim 10, wherein said pavement particles include an inner body comprising recycled concrete.

* * * * *